March 19, 1968 J. MANTELET 3,374,025
GRIPPERS FOR HANDLING OBJECTS
Filed June 3, 1966 2 Sheets-Sheet 1
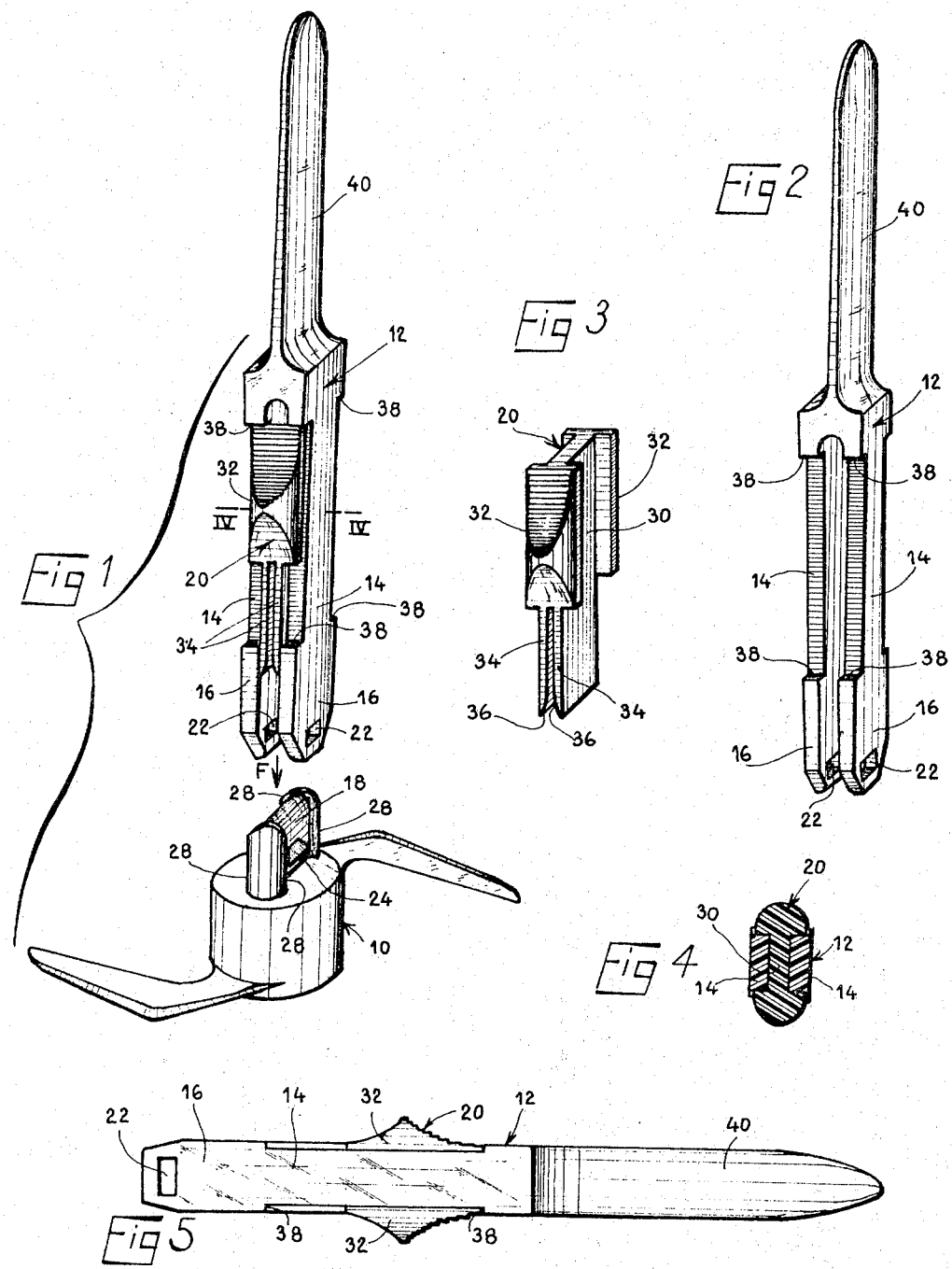

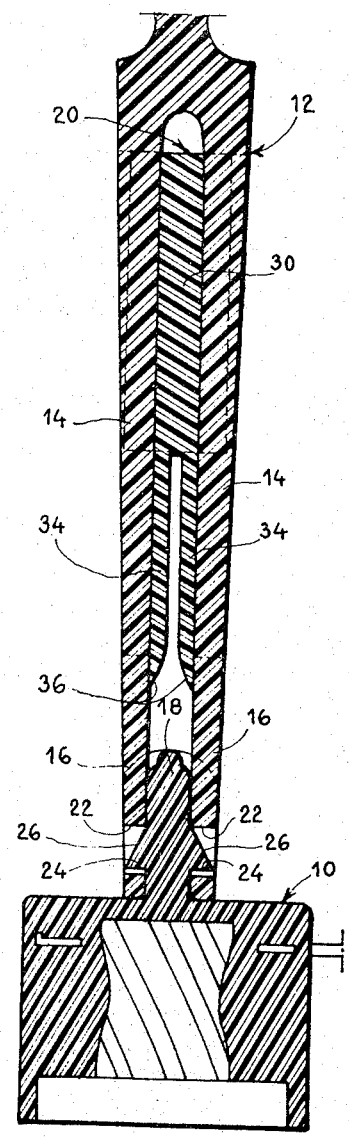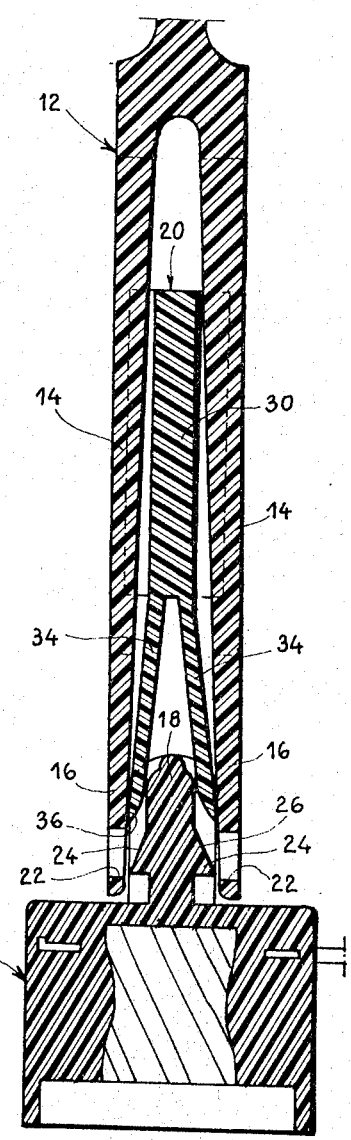

United States Patent Office 3,374,025
Patented Mar. 19, 1968

3,374,025
GRIPPERS FOR HANDLING OBJECTS
Jean Mantelet, Paris, France, assignor to Moulinex
Societe Anonyme, Bagnolet, France
Filed June 3, 1966, Ser. No. 555,171
Claims priority, application France, June 14, 1965,
20,680
5 Claims. (Cl. 294—16)

ABSTRACT OF THE DISCLOSURE

A gripper for handling an object, comprising a fork having two resilient limbs with jaws adapted to resiliently engage the object, and a releasing thrust element having an active part in the form of a pair of blades which insert between the limbs of the fork and the sides of the object to move the jaws out of the object-engaging positions.

---

This invention relates to a gripper for handling an object such as for example the chopping or mincing machine described in patent application No. 550,432, filed May 16, 1966, having very sharp parts, which after every operation, must be disassembled from the appliance for cleaning purposes, and then replaced in the working position. During these handling actions, the housewife runs the risk of being wounded, by bringing the hand in contact with the cutting parts of the tool.

The main object of the present invention is to provide a gripper which eliminates this disadvantage.

According to the invention a gripper comprises a fork having two resilient limbs with jaws at their ends adapted to engage a projection of the object, and an unlocking or releasing thrust element between the two limbs and adapted to slide between a locked position in which it leaves the said jaws freely in engagement with the projection and an unlocked position in which it acts on the inner faces of the limbs to increase the distance between the limbs to disengage the jaws from the projection.

In a preferred embodiment, the jaws are formed by blades pierced by holes or having recesses to engage protuberances on the projection of the object, the ends of the blades and the protuberances having contours partially inclined or rounded off so that by a simple thrust of the gripper on the projection, the gripper engages resiliently on the projection by sliding the one with respect to the other.

In order that the invention may be more fully understood an embodiment in accordance therewith will now be described by way of example, with reference to the accompanying drawings, in which:

FIGURE 1 is a perspective view of a gripper and a cutting tool with which this gripper is associated;

FIGURE 2 is a perspective view of the fork which forms part of the gripper of FIGURE 1;

FIGURE 3 shows the thrust element which is fitted to the fork of FIGURE 2 to form the gripper of FIGURE 1;

FIGURE 4 is a cross-section of the gripper along the line IV—IV of FIGURE 1;

FIGURE 5 is a side view of the gripper of FIGURE 1;

FIGURE 6 is a partial longitudinal cross-section of the gripper in the locked position on the tool to be handled; and FIGURE 7 is a view similar to FIGURE 6 showing the releasing or unlocking action thereof.

Referring to the drawings the gripper is used for handling a blade-bearing tool 10 of the domestic mincer or shredder described in the above-identified application, and comprises a fork 12 of plastic material with two resilient limb portions 14 having jaws 16 at their extremities for engagement with a projection 18 of the tool 10, and an unlocking or releasing thrust element 20, of plastic material, arranged between the limbs and adapted to slide between a locked position (FIGURE 6) in which it leaves the jaws 16 freely in engagement with the projection 18, and an unlocked or released position (FIGURE 7) in which this thrust element acting on the inner faces of the limbs 14 of the fork increases the distance between these limbs and takes the jaws 16 out of engagement with the projection 18.

Each jaw piece 16 is formed by a smooth blade having a hole 22 (or recess) in which is engaged a protuberance 24 of the projection 18. The extreme edge of each blade has an inner rounded-off contour, FIGURE 7. Each protuberance 24 has an inclined lateral face 26 and the end of the projection 18 itself has inclined or rounded-off sides as well as lateral fins or flanges 28 for guiding the jaws.

The sliding thrust element 20 comprises a central part 30 between the limbs 14 of the fork 12, two lateral parts 32 external to the limbs and forming actuating knobs as well as guide "shoes" for the thrust element, as well as an active part having the form of a pair of elastic blades 34 the tapered ends 36 of which are adapted to engage between the jaws 16 and the side of the projection 18 to constitute wedges for spreading the jaws apart. The thrust element 20 slides between abutments 38 on the lateral edges of the limbs of the fork 12 and co-operating with the lateral parts 32 of the thrust element.

The gripper thus formed may be locked onto the tool 10 by simple thrust of the gripper onto the projection 18 in the direction of arrow F, FIGURE 1, without any action on the thrust element: during this displacement, the rounded-off outlines of the ends of the jaws slip over the rounded-off sides of the projection 18, then over the inclined faces 26 of the protuberances 24. The jaws are spread apart until the holes 22 come into alignment with the protuberances 24, and engage thereover automatically by the resilience of the limbs 14. The gripper then occupies the position in FIGURE 6.

To operate the release, the thrust element 20 is pushed by the knobs 32 so that the tapered ends of the blades 34 are inserted between the projection 18 and the jaws 16 spreading the jaws (FIGURE 7).

The handle 40 of the fork 12 has the form of a spatula, which after the mincing or shredding operation, may serve as a scraper for the inner sides of the working bowl or for those of the cover of the shredder.

By means of the gripper the housewife may handle the tool 10 without risk of injury and she may clean it under a jet of hot water without scalding her fingers.

This gripper is of simple and economical construction; it does not comprise any screws, rivets or glued parts. Its two components are assembled simply by spreading the limbs of the fork apart and after placing the thrust element between them they automatically return to the position of FIGURE 1.

I claim:

1. A gripper for handling an object, comprising:
    (a) a fork having:
        (aa) a handle, and
        (bb) two resilient limbs integral with said handle and having opposed smooth faces and jaws at the ends of said smooth faces adapted to resiliently engage opposite sides of the object, and
    (b) a releasing thrust element comprising:
        (aa) a central part slidably disposed between the said smooth faces,
        (bb) an active part in the form of a pair of elastic blades integral with said central part and having tapered ends directed in the direction of said jaws, and (cc) an actuating part integral with said central part and disposed outside the said limbs of the fork for forming a manually operable knob to slidably move the thrust element in the direction of the jaws and simultaneously insert the tapered ends of the blades between the smooth faces of the limbs and the sides of the object to move the jaws out of the object-engaging positions.

2. A gripper according to claim 1, wherein the actuating part of the thrust element is formed by at least a lateral projection on the central part.

3. A gripper according to claim 2, wherein the thrust element slides between abutments formed on at least one of the lateral sides of a limb of the fork and cooperating with the lateral projection on the central part of the thrust element.

4. A gripper according to claim 2, wherein the actuating part of the thrust element is formed by a pair of oppositely extending lateral projections on the central part.

5. A gripper according to claim 4, wherein said lateral projections have a width greater than the width of the central part and overlie the limbs of the fork.

References Cited

UNITED STATES PATENTS 2,207,649   7/1940   Williams _____ 294—86.32 X

FOREIGN PATENTS 107,701   1/1900   Germany.

GERALD M. FORLENZA, *Primary Examiner.*

G. F. ABRAHAM, *Assistant Examiner.*